3,814,718
THERMOSETTING MOULDING COMPOSITIONS

Wolfram Busch, Massenheim-Gartenstadt, and Stefan Mullner, Niederhofheim, Germany, assignors to Chemische Werke Albert Aktiengesellschaft, Wiesbaden-Biebrich, Germany
No Drawing. Filed Nov. 15, 1972, Ser. No. 306,727
Claims priority, application Germany, Nov. 18, 1971, P 21 57 200.9; Aug. 5, 1972, P 22 38 669.2
Int. Cl. C08f 21/02
U.S. Cl. 260—32.6 R                    9 Claims

ABSTRACT OF THE DISCLOSURE

A thermosetting moulding composition comprising (A) an unsaturated polyester, (B) a copolymerizable monomer, (C) a filler or reinforcing substance, (D) a catalyst and (E) a mould-release agent or a combination thereof with a lubricant and (F) a compound of the formula

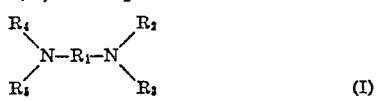

(I)

wherein $R_1$ is alkylene having 1 to 8 carbon atoms, arylene having 6 to 12 carbon atoms, diarylene-alkane, diarylene-sulphone or cycloalkylene having 5 to 8 carbon atoms, $R_2$ to $R_5$ are the same or different and are hydroxyl-terminated poly(oxyalkylene) groups derived from one or more alkylene oxides each containing 2 or 3 carbon atoms, a process for its preparation and a moulded body prepared therefrom.

---

This invention relates to themosetting moulding compositions.

It is known that moulding compositions based on unsaturated polyesters combined with filling and reinforcing agents, must have a very low production viscosity, but a much higher processing viscosity. The first requirement is based on the knowledge that, at high production viscosities, the glass fibres mainly used for reinforcement are destroyed to a greater or lesser extent by friction during the kneading process. The result is a much reduced strength in the finished article, increased susceptibility to breakage, greater orientation, and reduced thermal stability. Therefore the overall viscosity of the mixture during production must be kept as low as possible, but for the flowing processes during the processing of the moulding composition by moulding, transfer moulding or injection moulding processes, viscosities as high as possible must exist in order to prevent washing out of filling and reinforcing agents which would result in a great decrease in strength. In the case of a high composition viscosity all the components used flow uniformly into the mould and form a uniform homogeneous structure.

In practice, this requirement of differing viscosity is met by adding alkaline earth metal oxides or hydroxides to the moulding compositions, and depending on the type and quantity of addition, a more or less marked viscosity rise in the mixture is observed.

One disadvantage of moulding compositions based on unsaturated polyesters combined with filling and reinforcing agents e.g. of the pre-mix and pre-preg [1] types, which are produced on an industrial scale, i.e. types produced from mixtures or previously impregnated fibrous materials, is the particularly high volume shrinkage during hardening and cooling. This effect causes the surfaces of the moulded articles thus produced to be extremely wavey and in addition the whole part tends to warp and does not maintain its dimensions. If, when using organic or inorganic reinforcing agents, e.g. polyester, glass or asbestos fibres, there is an additional orientation of the fillers, then the warping and waviness are further increased, i.e. the part can only be used further for a limited number of purposes. If e.g. such parts are subsequently to be varnished or coated in any other way, particularly when large parts are involved, the surface has an increased reflecting capacity which makes the unevenness and waviness particularly visible so that the use thereof as visible components of the finished article is substantially excluded. Warping can be particularly critical, for example, when plastic members produced in this way are used in combination with metal members, e.g. steel sheets, as occurs for example in the motor car industry.

It has also been proposed to use mixtures of unsaturated cold-hardenable polyester resins and high percentage solutions of polystyrene, polyvinylcarbazole, polyvinylether or polyisobutylene or mixtures of such polymers in styrene, the polymer content of the total mixture being up to 20%, as casting or moulding materials for the production of non-shrinking moulded articles.

Thermosetting liquid casting and impregnating compositions or such compositions which liquify on heating have already been proposed, containing a neutral polyester obtained from acid esters of unsaturated polymerizable dicarboxylic acids and saturated monohydric alcohols by condensing glycols therewith, monomers containing polymerisable groups, and thermoplastic resins soluble in the composition and optionally in addition fillers. The thermoplastic resins can be present in the monomers in the form of solutions. As monomers have mainly been proposed styrene and its derivatives such as vinyltoluene, but also esters of acrylic or methacrylic acid. When using these esters, polyvinyl acetate or polymethacrylate esters can be added as thermoplastic resins.

The moulding compositions hitherto used or proposed do not have all the required properties, particularly the differing viscosity stages with low viscosity during production and maximum viscosity during processing of the moulded articles; they do not satisfy requirements regarding surface quality of the finished product, i.e. they have a definite shrinkage during processing, they warp, and they give products wherein the surface is not sufficiently planar. It is continually found that with such methods one or other requirement is not satisfied or not satisfied satisfactorily. It is, for example, known that the viscosity of moulding compositions giving products with good surface quality can only be increased with extreme difficulty.

One aspect of this invention now provides a thermosetting moulding composition comprising (A) an unsaturated polyester, (B) a copolymerizable monomer, (C) a filler or reinforcing substance, (D) a catalyst and (E) a mould-release agent and (F) a compound of the formula

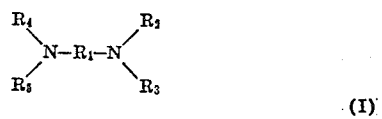

(I)

wherein $R_1$ is alkylene having 1 to 8 carbon atoms, arylene having 6 to 12 carbon atoms, diarylene-alkane having 13 to 15 carbon atoms, diarylene-sulphone having 12 carbon atoms or cycloalkylene having 5 to 8 carbon atoms, $R_2$ to $R_5$ are the same or different and are hydroxyl-terminated poly(oxyalkylene) groups derived from one or more alkylene oxides.

---

[1] Glass fiber webs impregnated with a solution of unsaturated polyester in an unsaturated monomer.

In the above general formula (I) $R_1$ may e.g. be alkylene of 1 to 6, 2 to 6 or 1 to 4 C-atoms, arylene of 6 to 10 C-atoms, diphenylene-methane, -propane or -sulphone, or cycloalkylene of 5 to 6 C-atoms. $R_2$ to $R_5$ which can be the same or different each consists of a homo or copolymer group, built up from one or more alkylene oxides with preferably 2 to 3 C-atoms.

The molecular weight of the compound I is generally between 350 and 1,000,000, advantageously between 1000 and 100,000, particularly between 2,000 and 15,000.

According to a preferred embodiment of the invention, in the Formula I, $R_1$ is ethylene and $R_2$, $R_3$, $R_4$ and $R_5$ in each case poly(oxyethylene/oxypropylene) groups. The diamino compound I can either be mixed directly with the unsaturated polyesters and reactive monomers or is present in the form of a 5 to 70%, advantageously 10 to 30% by weight, solution in the copolymerizable monomer, e.g. styrene. The moulding compositions according to the invention may e.g. contain 0.1 to 25%, advantageously 1 to 15% by weight, based on the total moulding composition, of the compound of Formula I.

According to a further preferred embodiment, $R_1$ in the compound of Formula I represents alkylene with 1 to 8, preferably 2 to 6 C-atoms, and $R_2$ to $R_5$ are identical and represent polymerisation products of propylene oxide. Particularly favorable results are obtained if the complemental weight ratios of unsaturated polyester to copolymerizable monomer to the diamino compound I are in the ranges (20 to 90):(10 to 70):(5 to 50) respectively. Within the indicated ranges, infinite variations are possible, depending on the desired production and processing viscosity, as well as the surface characteristics.

As alkylene oxides can be used e.g. ethylene oxide, propylene oxide, 1,2- or 2,3-butylene oxide, styrene oxide, cyclohexylene oxide or combinations thereof; ethylene oxide and propylene oxide or combinations thereof give particularly good results.

As diamines can be used, e.g. ethylene-, propylene-1,2- or 1,3- butylene or isobutylenediamine, o- or p-phenylene-, xylylene-, or naphthylendiamine; cyclopentylene-, or cyclohexylenediamine or methylcyclopentylenediamine.

The unsaturated polyesters generally have a molecular weight of 500 to 3000 and an acid number and an OH number in each case of 20 to 50. They are prepared from unsaturated and optionally also from saturated polycarboxylic acids or their anhydrides and polyhydric alcohols. Suitable unsaturated carboxylic acids are e.g. maleic acid, fumaric acid or itaconic acid. Suitable saturated (i.e. free from aliphatic multiple bonds) polycarboxylic acids are e.g. phthalic acid, isophthalic acid, terephthalic acid, succinic acid, adipic acid, sebacic acid, azelaic acid, suberic acid, and cyclohexanedicarboxylic acid or their anhydrides in so far as they exist.

The saturated dicarboxylic acids are generally used in a proportion of 0 to 90, preferably 0 to 70 mol percent. As alcohols are suitable e.g. ethylene glycol, propane-1,2-diol, propane-1,3-diol, butane-1,4-diol, butene-1,4-diol, dimethylpropane-1,3-diol, diethyleneglycol, dipropyleneglycol, dimethylolcyclohexane, bis-(hydroxyethyl)-or bis-(hydroxypropyl)-diphenylolmethane or -propane. The polyesters can be prepared in the conventional manner by the melt or solution polymerisation processes; in the latter case an entraining agent can also be used. Advantageously, those unsaturated polyesters are used whose acid component contains phthalic acid, terephthalic acid or isophthalic acid and/or those whose alcohol component contains 50 to 100 mol percent of propylene-1,2-glycol, dimethylpropane-1,3-diol or a mixture thereof.

Prior to incorporation, the polyesters are generally combined with the copolymerisable monomers in solution, e.g. with a mixing ratio of monomer to polyester in the range of 30:70 to 90:10.

The monomer should preferably be a solvent for the unsaturated polyester and the diamino compound, and contain the group

styrene being preferred. However it is also possible to use e.g. vinyltoluene, alkylstyrenes such as α-methyl- or tert-butylstyrene, and divinylbenzene; monomeric mono- or diacrylates, e.g. lower alkyl esters of methacrylic or acrylic acid and ethylenglycol; propane- or 1,3-butanediol dimethacrylates, or diacrylates. The alkyl group of the lower alkyl esters generally has 1 to 8 C-atoms, and is preferably methyl, ethyl, propyl or butyl.

Surprisingly, the polyester and diamino compound in solution are compatible with one another in the monomer, and a clear phase is obtained on mixing. This has the advantage that the fillers and fibres are ideally saturated. A further advantage is the rise in viscosity a short time after thoroughly mixing the two polymer solutions. As a result, in many cases, the addition of conventional metal oxides for increasing the viscosity of the moulding composition becomes superfluous.

The hardening of the moulding compositions takes place under the action of heat, pressure, and conventional catalysts, for example benzoyl peroxide, t-butyl perbenzoate or peroctoate, dicumyl peroxide, cyclohexanone peroxide, di-t-butyl peroxide, 2,5-(dimethyl)-2,5-(di-t-butyl peroxide)-hexane.

Generally the composition also contains interior and exterior lubricants, and/or mould-release agents mainly metal salts of fatty acids, e.g. zinc, calcium, aluminium or magnesium stearate, high molecular weight fatty acid esters, partial saponification products of said esters, degraded high moleculer weight polyethylene, e.g. a degradation product with a molecular weight of 5000 to 50,000, or silicones.

In the moulding compositions it is possible to include conventional inorganic minerals in the form of e.g. oxides, carbonates, sulphates or silicates, for example calcium carbonate, magnesium oxide, calcium sulphate or calcium aluminium silicate (so-called kaolin earths). In addition the compositions generally, but not necessarily, contain inorganic or organic fibres or fibre mats, e.g. glass or asbestos fibres or mats, polyacrylonitrile or polyethylene terephthalate fibres, mats, or fabrics, or combinations of such materials, to increase the mechanical strength and raise the modulus of elasticity. Furthermore, conventional additives, such as pigments, dyes, inhibitors and accelerators may be included.

Moulding compositions compounded on the above basis can be processed in various ways.

Moulding compositions containing cut inorganic or organic fibres can be processed discontinuously. For example the solutions of the unsaturated polyester and the diamino compound are dissolved in the copolymerizable monomer, combined together and then mixed in a kneader, e.g. with sigma blades, with the catalyst, fillers, mould release agents and optionally lubricants and further conventional additives if desired. Finally fibrous fillers are added to the homogeneous paste of low viscosity. A fibrous voluminous moulding composition results, which after being stirred for a short time in closed vessels assumes a non-tacky, highly viscous, consistency.

Moulding compositions of the above consistency having the indicated composition can also be produced continuously in an extruder. To this end, a mixture of all the dry components is passed into the apparatus and one or more previously mixed solutions of the unsaturated polyester in the copolymerizable monomer and the diamino compound in the monomer are supplied continuously to the dry mixture, e.g., via a pump.

To produce mat-like moulding materials, the above-indicated process can be modified by impregnating a low viscosity paste consisting of resins, fillers, catalysts, monomers, the diamino compound and optionally further conventional additives into a fibrous web or mat; the mat which is saturated with this paste is then covered on both sides with suitable impermeable films or foils, e.g. of polyethylene or polyethylene terephthalate. After a short storage time, the viscosity necessary for processing of the impregnated mat is obtained.

The moulding composition produced according to the invention can be hardened under the action of heat and pressure to moulded articles, advantageously members of large area, which are also resistant to mechanical stressing. The surfaces of these members are smooth and planar. These members have a low tendency to warp and can therefore be assembled with members of other materials, e.g. steel sheets. As regards design and surface characteristics, they are a true copy of the mould used. As opposed to this, moulded articles produced from corresponding conventionally hardenable polyester moulding compositions have a wavy, pitted surface, differing from that of the mould and showing the well-known shrinkage and local depression effects. The structure of the glass fibre component is thereby enhanced considerably. Particularly in the case of members of large area or those with large differences in wall thickness or when using injection or transfer moulding methods, it may be necessary to clamp the moulded article to a template during cooling due to the warping which frequently occurs.

Moulded articles produced from the moulding compositions according to the invention are for the above-indicated reasons eminently suitable for use as members which will be visible, because their surface satisfies the highest demands. Furthermore, the moulding compositions according to the invention are advantageously used when requirements regarding trueness of shape and size cannot, or can only with difficulty be achieved with conventional hardenable polyester long-fibre moulding compositions, particularly if the surface is subsequently to be provided with a finish such as varnishing, metallizing (e.g. vacuum metallizing or galvanizing), printing or some other type of coating. Such after-treatments generally make the surfaces of moulded articles more conspicuous than the untreated portions; unlike moulded articles produced from conventional moulding compositions, those produced from the moulding compositions according to the invention are particularly well-suited for such surface after-treatments, particularly also for economic reasons, because no pre-treatment such as stiffening, polishing, or finishing of the articles is necessary prior to the surface treatment.

In addition to the above-indicated advantageous characteristics of the moulding compositions or the moulded articles produced therefrom, the amino compounds present in the compositions according to the invention also have the advantage that, due to their basic nature, they can react with free carboxyl groups of the unsaturated polyester, and effectively aid the thickening effect necessary during processing, thereby making completely or partially redundant the introduction of inorganic thickening agents such as magnesium or calcium oxide. As this thickening effect takes place much more quickly than by means of inorganic thickeners, the undesirable exudation of the resin binder from the moulding composition is substantially prevented. A particularly favorable system uses a diamino compound wherein $R_1$ has the above-indicated meaning and $R_2$ to $R_5$ are the same, and represent polymerization products of propylene oxide, because therein the hydrophilic and hydrophobic properties are particularly well-balanced.

Due to their favorable mechanical strength, thermal stability, rigidity of shape, dimensional stability, very good electrical characteristics, ease of processing, and ecomonic production, moulded articles produced from compositions according to the invention can advantageously be used, e.g. in the following fields:

Vehicle building, particularly for parts of the body-work, headlight casings and reflectors, dashboards and components thereof, fittings, rear lights, coverings;
household equipment such as sewing machine parts, coffee grinders, multi-purpose cutters, juice extractors, parts of dishwashing and washing machines, refrigerators, television and radio receivers, hearth surrounds;
also parts for projectors, cameras, cine cameras, sanitary devices and fittings, office equipment and machines, e.g. typewriter frames and covers, furniture, e.g. chairs, table tops, school furniture, and furniture fittings;
parts for use in the building and fittings fields, e.g. door and window handles, covers and window seats, light fittings and transportation and packing containers, e.g. receptacles, boxes and stands.

The invention is illustrated in the following examples which are by way of illustration only. All parts are by weight.

EXAMPLE 1

Into 20 parts of a solution of an unsaturated polyester of 50 mol percent maleic anhydride, 20 mol percent of ethylene glycol and 30 mol percent propane-1,2-diol in styrene in the ratio of 70:30 by weight are stirred 10 parts of a solution of 4% by weight of tetra-(polyoxyethylenoxypropylene)-ethylenediamine (molecular weight 3,500; prepared by reacting propylene oxide and ethylene oxide in the molar ratio 1:1 with ethylendiamine) in styrene. The low viscosity solution thus-prepared is well mixed in a non-heated mixer, equipped with ground sigma-type blades with one part of calcium stearate, 2 parts of 50% t-butyl perbenzoate and 27 parts of ground limestone. To the viscous paste are finally added 30 parts of glass fibres (6 mm. long), finished with a vinylsilane size. After short kneading period, a straw-like fibrous mass is obtained. The viscosity of the mixture rises considerably after brief storage and reaches a value which offers considerable advantages for processing.

The moulding composition thus prepared can be processed within two minutes at 160° C. and a pressure of 100 kp./cm.$^2$ to form sheets having excellent surface characistics. The planar surfaces neither warp nor are wavy. In addition, the usually visible surface structures, caused by bundles of fibres, are completely eliminated.

Sheets based on the above-indicated compositions can be varnished without further prior treatment and can therefore advantageously be used in combination with metal structures without any warping occurring. In addition, moulded articles of this type have value as mechanical components.

Comparative test.—If Example 1 is modified to the effect that no diamino compound is added to the solution and a 30 part resin-styrene solution is used in combination with the other indicated components, then straw-like fibrous moulding compositions are obtained. Sheets produced therefrom have the known disadvantageous surface effects. The product warps considerably and has a very wavy surface, and in addition the bundles of fibers used are visible and give the material a disadvantageous pitted structure.

EXAMPLE 2

To 15 parts of a solution (70% by weight) of an unsaturated polyester produced from 30 mol percent of maleic anhydride, 50 mole percent of dimethylpropane-1,3-diol and 20 mol percent of isophthalic acid are added 15 parts of a 40% solution in styrene of a tetra (polyoxyethylene/oxypropylene) ethylenediamine (molecular weight 4,800) prepared by reacting ethylene oxide and propylene oxide in the molar ratio 1:7 with ethylenediamine.

To the low viscosity solution are added in admixture, as in Example 1, 1 part of calcium stearate, 2 parts of 50% dicumyl peroxide, 37 parts of ground kaolin and 20 parts of chopped silanised glass fibres having a length of 12 mm. After a short kneading period, a fibrous voluminous moulding composition is obtained, from which after a short storage time, during which the viscosity of the composition rises considerably, moulded articles with a smooth surface are obtained by moulding at 160° C. and 150 kg./cm.$^2$; the articles do not warp.

The good surface characteristics permit a completely satisfactory varnishing of the products without any prior treatment being necessary. Articles produced in this way can be combined with steel sheets, and after applying a varnish film it is impossible to distinguish between the surfaces of the metal sheet and the plastic.

Comparative test.—If the Example is performed without a styrene polymer solution, and the proportion of styrene polyester solution is raised to 30 parts, then in combination with the indicated components, moulded articles are obtained which after curing have the known surface deficiencies, namely warping, waviness, and pitting.

EXAMPLE 3

In 20 parts of a 70% solution in styrene of an unsaturated polyester prepared from 40 mol percent of maleic anhydride, 10 mole percent of phthalic acid, 20 mol percent of ethyleneglycol and 30 mol percent of propane-1,2-diol, are dissolved 10 parts of tetra (polyoxyethylene/oxypropylene) ethylenediamine (molecular weight 12,000) prepared by reacting propylene oxide and ethylene oxide in the molar ratio 1:1.

There is then added to the low viscosity mixture in a Meili mixer 1 part of calcium stearate, 1 part of magnesium oxide, 2 parts of tert-butyl benzoate, 17 parts of ground limestone, 20 parts of ground kaolin and 10 parts of chopped silanized 6 mm. glass fibres and the conglomerate is mixed intensively for about five minutes. The putty-like compact moulding composition, after a short storage time during which the viscosity rises rapidly, may be processed within two minutes at 160° C. and 150 kg./cm.² to plates which do not warp and have a smooth non-structured surface. These blanks can be varnished without further treatment and are in this state indistinguishable from carefully treated steel sheets.

Comparative test.—If Example 3 is repeated, except that the styrene/polymer solution is replaced by the styrene/unsaturated polyester of Example 3 then a putty-like moulding composition is obtained which form articles which in the uncured state tend to wrap, have a high degree of waviness and a pitted fibrous structure.

The values obtained on testing the moulded articles of Examples 1–3 and the comparative tests according to DIN 16 911 are summarized in the Table hereinafter.

EXAMPLE 4

One proceeds as in Example 1, but replacing the amine by the same quantity of tetra (polyoxypropylene) ethylenediamine, which is obtained by reacting propylene oxide with ethylenediamine.

The sheets produced as in Example 1 when tested had the values indicated in the following Table. The third column of the following Table is the values obtained in the comparative test, obtained analogously to the comparative test of Example 1.

EXAMPLE 5

One proceeds as in Example 2 but using as amine tetra(polyoxypropylene) ethylenediamine. The characteristic values of the moulded articles obtained were determined according to DIN 16 911 and are summarized in the following Table together with those of a comparative test obtained analogously to the comparative test of Example 2.

EXAMPLE 6

One proceeds as in Example 3, but using as amine tetra(polyoxypropylene)ethylenediamine, obtained by reacting propylene oxide and ethylenediamine. The values obtained on testing the moulded articles produced are given in the Table together with the results obtained from a comparative test, performed analogously to the comparative test of Example 3.

TABLE

| Example | 1 | 1 1 | 2 | 1 2 | 3 | 1 3 | 4 | 1 4 | 5 | 1 5 | 6 | 1 6 |
|---|---|---|---|---|---|---|---|---|---|---|---|---|
| Flexural strength, kg./cm.² | 780 | 750–860 | 870–930 | 830–950 | 780–850 | 690–780 | 810 | 720–780 | 790–860 | 910–970 | 810–870 | 720–810 |
| Impact strength, kg. cm./cm.² | 21–26 | 19–24 | 27–31 | 25–29 | 14–17 | 13–16 | 21–26 | 20–23 | 26–29 | 23–26 | 13–18 | 14–17 |
| Notched impact strength, kg. cm./cm.² | 22–27 | 21–26 | 25–29 | 26–31 | 16–21 | 15–19 | 22–27 | 19–25 | 23–28 | 21–23 | 15–19 | 13–17 |
| Dimensional stability according to Martens, °C | 178 | 204 | 156 | 172 | 168 | 173 | 163 | 194 | 162 | 169 | 162 | 178 |
| Processing shrinkage, percent at— | | | | | | | | | | | | |
| 140° C | | | 0.02 | | 0.01 | | | | 0.02 | | 0.01 | |
| 160° C | 0.03 | 0.47 | 0.04 | 0.38 | +0.03 | 0.35 | 0.032 | 0.47 | 0.04 | 0.38 | +0.03 | 0.35 |
| Water up-take, mg | | | | | | | 43 | 78 | 33 | 83 | 28 | 76 |
| Surface resistivity (after 2 days in water), ohm | | | | | | | $10^{10}$ | $10^8$ | $10^{10}$ | $10^7$ | [$10^{11}$ | $10^8$ |

¹ Comparative test.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A thermosetting moulding composition comprising (A) an unsaturated polyester having an acid number and a hydroxyl number each between 20 and 50 and a molecular weight between 500 and 3,000, (B) a copolymerizable monomer, (C) a filler or reinforcing substance, (D) a catalyst and (E) a mould-release agent or a combination thereof with a lubricant and (F) 0.1 to 25% by weight of a compound of the formula

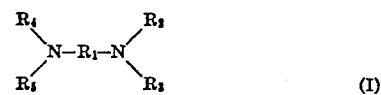

(I)

referred to the total moulding composition, having a molecular weight between 350 and 1,000,000 and wherein $R_1$ is alkylene having 1 to 8 carbon atoms, arylene having 6 to 12 carbon atoms, diarylene-alkane having 13 to 15 carbon atoms, diarylene-sulphone having 12 carbon atoms or cycloalkylene having 5 to 8 carbon atoms. $R_2$ to $R_5$ are the same or different and are hydroxyl-terminated poly(oxy-alkylene) groups derived from one or more alkylene oxides each containing 2 or 3 carbon atoms, and wherein the complemental weight ratios of the unsaturated polyester to the copolymerizable monomer to compound I are in the ranges (20 to 90):(10 to 70): (5 to 50).

2. A moulding composition as claimed in claim 1 wherein $R_1$ is alkylene having from 1 to 6 carbon atoms and the groups $R_2$ to $R_5$ are derived from polymerization of propylene oxide alone or a combination of propylene oxide with ethylene oxide.

3. A moulding composition as claimed in claim 1 wherein compound I is a 5 to 70% by weight solution in the copolymerizable monomer.

4. A moulding composition as claimed in claim 1 containing inorganic or organic fibres in the form of a mat saturated with a mixture of said components A, B, D, E and F and covered on both sides with impermeable films or foils.

5. A moulding composition as claimed in claim 4 wherein the impregnated web is covered on both faces with a foil consisting of polyethylene or polyethylene terephthalate to form a multilayer body.

6. A process for the preparation of a moulding composition as claimed in claim 1 wherein first a solution of the unsaturated polyester and a solution of compound I each in the copolymerizable monomer are combined, then the other components except fillers are added, the mass is homogenized, and finally fillers are added.

7. A modification of the process as claimed in claim 6 wherein a mixture of all dry components is continuously fed to an extruder and one or more solutions of compound I and the unsaturated polyester in the copolymerizable monomer are continuously added and blended therewith.

8. A hardened moulded body prepared from a moulding composition as claimed in claim 1.

9. A moulded body as claimed in claim 1 whose surface is coated with lacquer or metallized.

References Cited
UNITED STATES PATENTS

| | | | |
|---|---|---|---|
| 2,874,138 | 2/1959 | Jackson | 260—32.6 R X |
| 3,105,063 | 9/1963 | Damusis | 260—75 NQ X |
| 3,641,203 | 2/1972 | Eimers et al. | 260—864 X |

MORRIS LIEBMAN, Primary Examiner

S. M. PERSON, Assistant Examiner

U.S. Cl. X.R.

260—40 R, 861, 864